Sept. 20, 1960     S. GILBERT     2,953,227
SELF-ALIGNING CLUTCH ASSEMBLY
Filed April 27, 1959
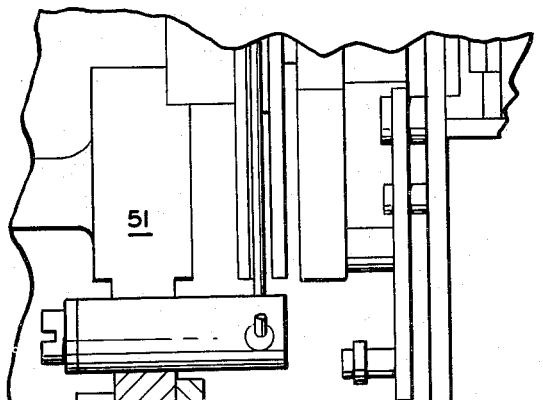
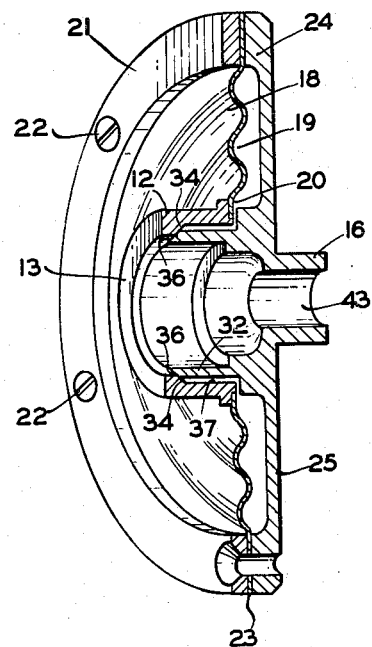
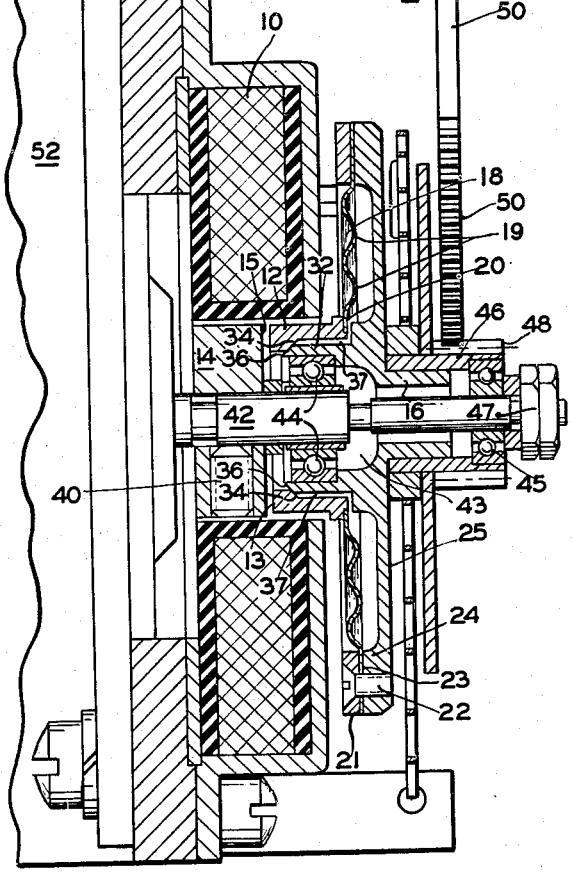
INVENTOR.
SAMUEL GILBERT
BY Herbert L. Davis
ATTORNEY

2,953,227
SELF-ALIGNING CLUTCH ASSEMBLY

Samuel Gilbert, Cedar Grove, N.J., assignor to The Bendix Corporation, a corporation of Delaware Filed Apr. 27, 1959, Ser. No. 809,207

3 Claims. (Cl. 192—84)

The invention relates to a self-aligning clutch assembly and more particularly to improvements in an electromagnetically operated clutch assembly of a type disclosed and claimed in U.S. Patent No. 2,407,757, granted September 17, 1946 to Alan M. MacCallum and to a clutch assembly particularly adapted for use under the extreme vibratory conditions encountered in aircraft and in an aircraft altitude control system of a type disclosed and claimed in U.S. Patent No. 2,512,902, granted June 27, 1950 F. Henry S. Rossire, both of which patents have been assigned to Bendix Aviation Corporation.

In the diaphragm type clutch assemblage disclosed in the aforenoted patents there has been heretofore encountered breakage or failure of the diaphragm due to fatigue stresses under the extreme vibratory conditions encountered in aircraft. Thus when subjected to such vibration, the central hub of the clutch mounted on a diaphragm or resilient member, as shown in the aforenoted patents, tended to act as a pendulum subjecting the resilient member to fatigue stress which brought on a failure within a very short time.

Moreover in an effort to avoid such failures due to fatigue stress, the central hub and movable part of the clutch assemblage was arranged so as to be slideably mounted on a closely fitting inner hub portion so as to maintain concentricity and squareness with the mating parts and to protect the diaphragm from fatigue stresses due to the extreme vibration encountered under aircraft flight conditions. Further, the close fit between the electromagnetically operated iron hub and inner hub supporting portion would not allow for any out-of-square condition brought on by tolerance accumulation so that even if parts moved freely when first assembled, after a short time in service, oxide generated by the rubbing of the iron hub on the inner hub by such close fit would cause a binding between the operating parts resulting in errors in the operation of such clutch due to friction and excessive time lag in the engagement and disengagement of the clutch with no means being provided for compensation for out of squareness and eccentricity of parts in the clutch assemblage.

An object of the invention is to provide an improved and novel clutch assembly in which a moveable clutch member is biased by a flexible diaphragm to a first position in engaging relation with a cone shaped surface carried by an inner hub member loosely fitting within the movable clutch member and in such a manner that the movable clutch member is supported by the cone shaped surface so as to protect the diaphragm from breakage or failure due to fatigue stresses under the extreme vibratory conditions encountered in aircraft and an assembly in which upon energization of the controlling electromagnet the clutch member is actuated thereby so as to move off of the cone shaped surface to a second position in engaging driving relation with an opposite cooperating clutch element and in which arrangement upon movement being imparted to the clutch member, the clutch member as supported by the flexible diaphragm becomes self-aligning relative to the opposite clutch element and free of friction with the inner hub member and cone shaped surface thereof so that engagement and disengagement between the clutch member and opposite clutch element is free of adverse time lag or errors due to binding between the operating parts of the assembly.

Another object of the invention is to provide a novel cone-supported clutch in which a clutch member biased by a flexible diaphragm rests on a cone shaped supporting member when not in driving relation with an opposite clutch element so as to protect the diaphragm from breakage or failure due to fatigue stresses under extreme vibratory conditions such as encountered in aircraft.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawings:

Fig. 1 is a side sectional view of the novel clutch assembly and surrounding electromagnetic control coil of the present invention.

Fig. 2 is a fragmentary sectional view of the diaphragm biased cone-supported clutch member of the present invention, as shown in perspective.

Referring to the drawing of Fig. 1, numeral 10 represents an electromagnetic coil concentrically mounted around two clutch members 12 and 14 which may be formed of magnetic material and having clutch surfaces 13 and 15 respectively. Clutch 12 is connected to a drive shaft 16 through a flexible spring diaphragm means 18. The diaphragm 18 may include corrugations 19 around an axial center portion 20 soldered or otherwise suitably secured to the inner end of the clutch member 12. The diaphragm 18 is further secured, as shown in Fig. 2, by a retainer ring 21 and bolts 22 at a non-corrugated annular area 23 to an annular flange 24 projecting from a disc like plate 25. The plate 25 is formed integral with the shaft 16 which projects axially therefrom.

When the movable driving clutch member 12 is not in a clutch engaging relation with the opposite driven clutch element 14, the clutch 12 is biased by the spring diaphragm means 18 axially into contacting relation with an inner member hub 32 projecting from the plate 25 at the opposite side from and in axial alignment with the drive shaft 16.

As shown in the drawing of Fig. 2, the clutch 12 has an inner conical seat 34 arranged to cooperate in engaging relation with a cone shaped surface 36 turned at a thirty degree angle on the free end of the inner hub portion 32. The arrangement is such that there is provided a substantial clearance 37, in the nature of .012 of an inch, between the inner hub portion 32 and the inner surface of the movable clutch member 12. The inner hub portion 32 projects axially from the disc 25 into the movable clutch 12 so that clutch 12 under the spring force of the diaphragm 18 is moved so as to cause the seat portion 34 thereof to rest on the cone shaped end 36 of the inner hub 32.

The foregoing arrangement of seat 34 of the movable clutch 12 resting on the cone shaped end 36 of the inner hub 32 under the biasing force of the diaphragm 18 is such as to protect the diaphragm 18 from fatigue stresses due to the extreme vibration encountered in the aircraft and under which conditions the clutch assemblage is designed for use.

Moreover, upon energization of the electromagnet 10, the clutch 12 under the magnetic force of the electromagnet 10 leaves the conical seat 36 free of adverse friction between the inner surface of the clutch member 12 and the inner hub portion 32, because of the substantial space 37 therebetween. Thus, in view of the foregoing friction free action, the clutch surface 13 of the clutch member 12 due to the universal action of the supporting diaphragms 18 makes full contact with the mating surface 15 of the opposite cooperating clutch element 14 free of adverse time lag.

Similarly upon deenergization of electromagnetic coil 10 the diaphragm spring means 18 may actuate the clutch member 12 axially out of the clutching relation with the element 14 and into the aforenoted seating relation with the cone shaped end 36 of the inner hub portion 32 without adverse time delay due to binding or interference between the operating parts of the clutch assembly.

As shown in the drawing of Fig. 1, the clutch element 14 may be suitably secured by a fastening screw 40 or other suitable means to a driven shaft 42 extending through a bore 43 in the plate 25 and through members 16 and 32. The driven shaft 42 is supported by a bearing 44 mounted in the bore 43.

The outer free end of the shaft 42 is further supported by a bearing 45 carried by a sleeve 46 and held therein by lock nuts 47. The sleeve 46 is secured by suitable means to the shaft 16 and has teeth 48 engaged by a sector 50 which may be operated in response to movement imparted by an aneroid diaphragm or other suitable mechanism not shown and provided in a housing 51 of an aircraft altitude control of a type such as disclosed in the aforenoted Rossire U.S. Patent No. 2,512,902. The driven shaft 42 is further drivingly connected to a synchro or other suitable operating mechanism not shown and provided in a housing 52. The operating mechanism may be of a type, for example, such as disclosed in the aforenoted Rossire U.S. patent.

From the foregoing, it will be seen that through the novel arrangement herein provided there has been effected an improved clutch assembly which eliminates adverse time lag in the make and break of respective clutch elements 12 and 14 and errors heretofore encountered in prior devices due to binding between the operating parts of such prior devices.

The precise and accurate operation of the clutch mechanism to which the present invention relates is essential for the safe operation of aircraft altitude controls in which it has been found that critical failures in automatic controls of the type disclosed in the Rossire U.S. Patent No. 2,512,902 have been heretofore due to faulty operation of the clutch mechanism provided therein and to defects therein commonly referred to as "clutch jump" and "clutch drag" and which may be directly or indirectly attributed to those obscure failures in the clutch mechanism, as heretofore explained, and which the present invention is specifically designed to avoid.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use under vibratory operating conditions, a clutch assembly of a type including a pair of opposed clutch members, an electromagnetic winding for moving one of the clutch members into operative relation with the other of said clutch members, a disc like plate having a flange projecting therefrom, a resilient spring member, means for securing the spring member about an outer edge thereof to said flange, a hub portion extending axially from one side of the plate, and another hub portion extending axially from an opposite side of the plate; the improvement comprising said other hub portion extending axially into said one clutch member in spaced relation to an inner surface within the one clutch member, said one clutch member having a flange portion projecting from said inner surface so as to provide a seat portion at an inner end thereof, said other hub portion having a cone portion provided at the free end thereof for cooperatively engaging said seat portion under the biasing force of said resilient spring member during deenergization of said electromagnetic winding so as to effectively support the one clutch member and thereby the spring member in such a manner as to protect the spring member from breakage due to fatigue stresses under such vibratory operating conditions, said seat portion cooperating with said cone portion of said other hub portion so as to permit upon energization of said electromagnetic winding axial movement of said one clutch member free of friction with said other hub portion, and said spring member acting to effect axial alignment of the one clutch member wtih the other clutch member upon the magnetic force of the electromagnetic winding moving the one clutch member into engaging relation with the other clutch member.

2. For use in an aircraft altitude control system under vibratory operating conditions; a clutch assembly comprising a pair of opposed clutch members, an electromagnetic winding for moving one of the clutch members into operative relation with the other of said clutch members, said one clutch member being annular in form, a disc like plate having an annular flange projecting therefrom, a resilient spring diaphragm having annular corrugations, means for securing the diaphragm about a peripheral edge to said flange, a hub portion extending axially from a central portion of said plate and from one side thereof, another hub portion extending axially from an opposite central portion of the plate, said other hub portion extending axially into said annular one clutch member and in spaced relation to the inner surface within said one clutch member, said one clutch member having an annular flange portion projecting from the inner surface thereof so as to provide a seat portion at an inner end thereof, said other hub portion having a cone portion provided at the free end thereof for cooperatively engaging said seat portion under the biasing force of said resilient spring diaphragm during deenergization of said electromagnetic winding so as to effectively support the one clutch member and thereby the diaphragm in such a manner as to protect the diaphragm from breakage due to fatigue stresses under such vibratory operating conditions, said seat portion cooperating with said cone portion of said other hub portion so as to permti upon energization of said electromagnetic winding axial movement of said one clutch member free of friction with said other hub portion, and said diaphragm acting to effect axial alignment of the one clutch member with the other clutch member upon the magnetic force of the electromagnetic winding moving the one clutch member into engaging relation with the other clutch member.

3. A clutch assembly comprising a pair of opposed clutch members, an electromagnetic winding for moving one of the clutch members into operative relation with the other of said clutch members, a plate having a flange projecting therefrom, a resilient spring member, means for securing the spring member about an outer edge thereof to said flange, a hub portion extending axially from one side of the plate, another hub portion extending axially from an opposite side of the plate, said one clutch member having an axial bore therein, said other hub portion so as to permit upon energization of said relation to an inner surface defining said bore, said one clutch member having a flange portion projecting into said bore from said inner surface so as to provide a seat portion at an inner end of the bore, said other hub portion cooperatively engaging said seat portion under the biasing force of said resilient spring member during deenergization of said electromagnetic winding so as to effectively support the one clutch member in spaced relation to said other hub portion and the spring member in such a manner as to protect the spring member from breakage under vibratory operating conditions, said seat portion cooperating with said other hub portion so as to permit upon energization of said electromagnetic winding axial movement of said one clutch member free of friction between said other hub portion and the inner surface defining the bore within said one clutch member, and said spring member acting to effect axial alignment of the one clutch member with the other clutch member upon the magnetic force of the electromagnetic winding moving the one clutch member into engaging relation with the other clutch member.

References Cited in the file of this patent

UNITED STATES PATENTS

| | | |
|---|---|---|
| 2,180,412 | Hart | Nov. 21, 1939 |
| 2,315,298 | Thompson | Mar. 30, 1943 |
| 2,841,258 | Jewell | July 1, 1958 |

UNITED STATES PATENT OFFICE
CERTIFICATE OF CORRECTION

Patent No. 2,953,227                        September 20, 1960

Samuel Gilbert

It is hereby certified that error appears in the printed specification of the above numbered patent requiring correction and that the said Letters Patent should read as corrected below.

Column 4, line 67, for "so as to permit upon energization of said" read -- extending axially into said bore in spaced --.

Signed and sealed this 4th day of April 1961.

(SEAL)
Attest: ERNEST W. SWIDER
Attesting Officer

ARTHUR W. CROCKER
Acting Commissioner of Patents